US011687859B2

(12) United States Patent
Jambor-Sadeghi

(10) Patent No.: US 11,687,859 B2
(45) Date of Patent: *Jun. 27, 2023

(54) SOFTWARE WITH IMPROVED VIEW OF A BUSINESS PROCESS

(71) Applicant: Aurea Software, Inc., Austin, TX (US)

(72) Inventor: Kamyar Jambor-Sadeghi, Tiburon, CA (US)

(73) Assignee: Aurea Software, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/468,244

(22) Filed: Sep. 7, 2021

(65) Prior Publication Data

US 2022/0004948 A1    Jan. 6, 2022

Related U.S. Application Data

(63) Continuation of application No. 16/700,269, filed on Dec. 2, 2019, now Pat. No. 11,138,541, which is a (Continued)

(51) Int. Cl.
*G06F 3/048* (2013.01)
*G06Q 10/0633* (2023.01)
(Continued)

(52) U.S. Cl.
CPC ......... *G06Q 10/0633* (2013.01); *G06Q 10/06* (2013.01); *G06F 3/0484* (2013.01); (Continued)

(58) Field of Classification Search
CPC .. G06Q 10/0633; G06Q 10/06; G06F 40/183; G06F 40/169; G06F 3/0484; G06F 8/34; (Continued)

(56) References Cited

U.S. PATENT DOCUMENTS

| 6,509,898 B2 * | 1/2003 | Chi | G06F 16/9558 |
| | | | 345/440 |
| 2003/0106039 A1 * | 6/2003 | Rosnow | G06Q 10/06 |
| | | | 717/100 |

(Continued)

OTHER PUBLICATIONS

Notice of Allowance dated Jun. 4, 2021, filed in U.S. Appl. No. 16/700,269, pp. 1-8.
(Continued)

*Primary Examiner* — Mahelet Shiberou

(57) ABSTRACT

The proper visualization of a business process plays a key role in analyzing, changing, simulating and monitoring the business process. Most BPMS systems today, provide a modeling environment where the business user can define and visualize business processes as BPMN diagrams. Some more advanced systems (such as Savvion Business Manager) enable monitoring of the business process at run-time via a color-coded view of the process diagram. While process diagram is an important view of the process, it lacks the level of abstraction needed to provide information in an optimal way to the business users. The proposed visualization, called the 360 degree view provides an optimal view of a business process without losing important details about the process.

16 Claims, 10 Drawing Sheets

Related U.S. Application Data continuation of application No. 15/841,958, filed on Dec. 14, 2017, now Pat. No. 10,552,780, which is a continuation of application No. 15/377,403, filed on Dec. 13, 2016, now Pat. No. 9,875,453, which is a continuation of application No. 14/451,771, filed on Aug. 5, 2014, now Pat. No. 9,552,563, which is a continuation of application No. 12/613,353, filed on Nov. 5, 2009, now Pat. No. 8,832,580.

(60) Provisional application No. 61/111,521, filed on Nov. 5, 2008.

(51) Int. Cl.
*G06Q 10/06* (2023.01)
*G06F 40/169* (2020.01)
*G06F 40/183* (2020.01)
*G06F 3/0484* (2022.01)
*G06T 11/20* (2006.01)

(52) U.S. Cl.
CPC .......... *G06F 40/169* (2020.01); *G06F 40/183* (2020.01); *G06T 11/206* (2013.01)

(58) Field of Classification Search
CPC .. G06F 3/0481; G06F 3/04817; G06F 9/4443; G06T 11/206; G05B 19/0426
See application file for complete search history.

(56) References Cited

U.S. PATENT DOCUMENTS

| | | | | |
|---|---|---|---|---|
| 2005/0219262 A1* | 10/2005 | Hao | ...................... | G06Q 10/08 345/619 |
| 2006/0041461 A1* | 2/2006 | Vucina | ................... | G06Q 10/10 345/440 |
| 2007/0234234 A1* | 10/2007 | Leidig | ..................... | G06F 16/26 715/825 |
| 2008/0307369 A1* | 12/2008 | Liu | ........................ | G06T 11/206 715/855 |
| 2009/0125831 A1* | 5/2009 | Dandurand | ............. | G06F 16/26 715/772 |
| 2009/0262131 A1* | 10/2009 | Suntinger | .............. | G06Q 10/06 345/619 |

OTHER PUBLICATIONS

Response to Final Office Action dated May 24, 2021, filed in U.S. Appl. No. 16/700,269, pp. 1-7.
Final Office Action dated Dec. 22, 2020, filed in U.S. Appl. No. 16/700,269, pp. 1-6.
Terminal Disclaimer Filed on Dec. 8, 2020, filed in U.S. Appl. No. 16/700,269, pp. 1-3.
Terminal Disclaimer Approved on Dec. 8, 2020, filed in U.S. Appl. No. 16/700,269, p. 1.
Response to Non-Final Office Action dated Dec. 7, 2020, filed in U.S. Appl. No. 16/700,269, pp. 1-8.
Non-Final Rejection dated Aug. 5, 2020, filed in U.S. Appl. No. 16/700,269, pp. 1-13.

* cited by examiner

SOFTWARE WITH IMPROVED VIEW OF A BUSINESS PROCESS

RELATED APPLICATION

The present application claims priority to U.S. provisional patent application No. 61/111,521, filed on 5 Nov. 2008; all of the foregoing patent-related document(s) are hereby incorporated by reference herein in their respective entirety (ies).

BACKGROUND OF THE INVENTION

1. Field of the Invention

The present invention relates to computer software for working with business processes ("business process related computer software") and more particularly to user interfaces for business process related computer software.

2. Description of the Related Art

In business process related computer software, users are conventionally provided with process diagrams. These diagrams are generated by the business process related software and displayed to the user on a video display and/or a printed-out "hard" copy. User review these process diagrams for many reasons, including: (i) to understand the process; (ii) to edit the process and process diagram; (iii) to compare an abstract or target version of the process to the manner in which the process is actually performed in the real world; (iv) to compare various trial, iterations or performances of the process; (v) to control machines, computers, industrial appliances or other commercial-process hardware based on the information in the process diagram; and/or (vi) to transform matter (for examples, processing raw physical, pharmaceutical materials; treating medical patients; transferring funds). With process diagrams, it takes a user some amount of time and attention to understand the time to fully understand the process, of course. The amount of time and attention that is required to analyze a process diagram will generally depend upon at least the following factors: (i) the number of process steps (see DEFINITIONS section) in the process; (ii) the number of alternative paths through the process; (iii) the number of concurrent paths through the sub-process and/or (iv) the media on which the process is being analyzed. Conventional process diagrams are a useful tool and are likely to remain so for the foreseeable future.

The most common way of analyzing any complex business process, using conventional business process views, involves the following steps: (i) diagram out the business process using a tool; (ii) print the process diagram over multiple pages; (iii) stitch the pages together a common board; and (iv) trace the paths through the process; and (v) mark various worksteps along the path(s). The larger the process gets, the more time will be spent in: (i) deciding on the optimal printing size of the process without losing legibility; (ii) stitching multitude of pages to reconstruct the process diagram on hard copy (for example, paper pasted to a common board); and (iii) translating the modifications and/or corrections made on paper back to the process as represented in the business process related computer software.

FIG. 1 is an illustration of a screen 100 with a from an exemplary, software-implemented integrated development environment ("IDE"), showing a diagram view of a very simple order processing business process. This is called a diagram view because it is similar in nature to a flowchart. As shown in the figure, even for this simple process, it is hard to identify the 4 paths that can lead the process from start 102 to finish 104. Conventionally, this is how business processes are displays, leading to the difficulties identified above.

BRIEF SUMMARY OF THE INVENTION

The present invention is directed to a user interface portion of business process related computer software that provides improved views of the business process. These conventional abstract views may be generated with a particular analysis aspect in mind. For example, if process is being analyzed for optimizing time, the view may show the time statistics for each of the process steps in the process. Or if the analysis is based on cost of execution, each path through the process may be annotated with the total cost of execution. The superposition of data on the view can be statically derived from estimated values defined at design time, be generated randomly via a simulation engine, or be retrieved from a business process management system ("BPMS") based on execution history.

A preferred business process view according to the present invention is called an angular business process view. Under the angular process view, a two dimensional (that is, at least two dimensional) set of co-ordinates is set up, with the (at least) two dimensions being: (i) angular; and (ii) radial. Various tasks of the business process are allocated different angular segments of the co-ordinate set, while the radial dimension represents time sequence of ordered tasks and/or time. The angular and radial dimensions will serve to define an origin for the angular view, and this origin is preferably centered in the center of the process view. The angular view may represent only a portion of the process steps (that is, a sub-process) of a larger business process. Preferably, the origin represents either the start point or the end point of the represented process or sub-process Preferably: (i) radial distance from the origin represents time (or inverse time, if the process steps are shown to be converging on an endpoint at the origin); (ii) radial length of a process step represents the amount of time that the process step takes (or is targeted to take); (iii) angular alignment (or partial angular alignment) of process steps represents the sequence of steps in a sub-process; and (iv) process steps that are radially aligned, but angularly, mutually offset from each other are either parallel concurrent process steps or alternative concurrent process steps. As will become clear from the detailed discussion below, in many cases, concurrent business process step chains (see DEFINITIONS section) can be more easily understood and assimilated by human users when the user uses an angular view to view a business process (see DEFINITIONS section) or sub-process.

Various embodiments of the present invention may exhibit one or more of the following objects, features and/or advantages:

(i) reduce time spent analyzing the business process;
(ii) improve clarity and/or focus of analysis of a business process;
(iii) avoid the need to stitch or cut and paste multiple page hard copies together to provide an appropriate view of the business process;
(iv) avoid recourse to convention views of a business process with tiny print;
(v) improved user understanding of business processes;
(vi) improved editing of business processes by users;

(vii) improved comparisons, by users, of an abstract or target version of the business process to the manner in which the business process is actually performed in the real world;

(viii) improved comparison, by users, of various trial, iterations or performances of the business process in the real world;

(ix) improved control of machines, computers, industrial appliances or other commercial-process hardware based on the information in the process diagram that are controlled (at least in part) based on the business process; and/or (x) improved transformations of matter (for examples, processing raw physical, pharmaceutical materials; treating medical patients; transferring funds, transferring possession of good, executing services that involve a transformation of matter) where the transformation of matter is controlled (at least in part) by the business process.

According to an aspect of the present invention, a method includes the steps of: (i) providing a business process comprising a plurality of business process steps; (ii) generating, by a machine, an angular business process view corresponding to the business process, with the angular business process view defining at least an angular direction and a radial direction, with each business process step being represented as an angular block in the angular business process view, with the ordering of the angular blocks in the angular direction representing different process step chains or sub-chains and with the ordering of the angular blocks in the radial direction representing temporal order of the business process steps; and creating, by a machine, a visual representation of the angular business process view.

According to a further aspect of the present invention, business process related computer software program is stored in any way that can be accessed an read by a computer or set of computers (for example stored in a tangible medium, such as on a disc of flash drive). The software program includes a business process module; and an angular view module. The business process module is programmed to store at least one business process, with the business process including a plurality of business process steps. The angular view module is programmed to display the business process as an angular business process view defining at least an angular direction and a radial direction, with each business process step being represented as an angular block in the angular business process view, with the ordering of the angular blocks in the angular direction representing different process step chains or sub-chains and with the ordering of the angular blocks in the radial direction representing temporal order of the business process steps.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
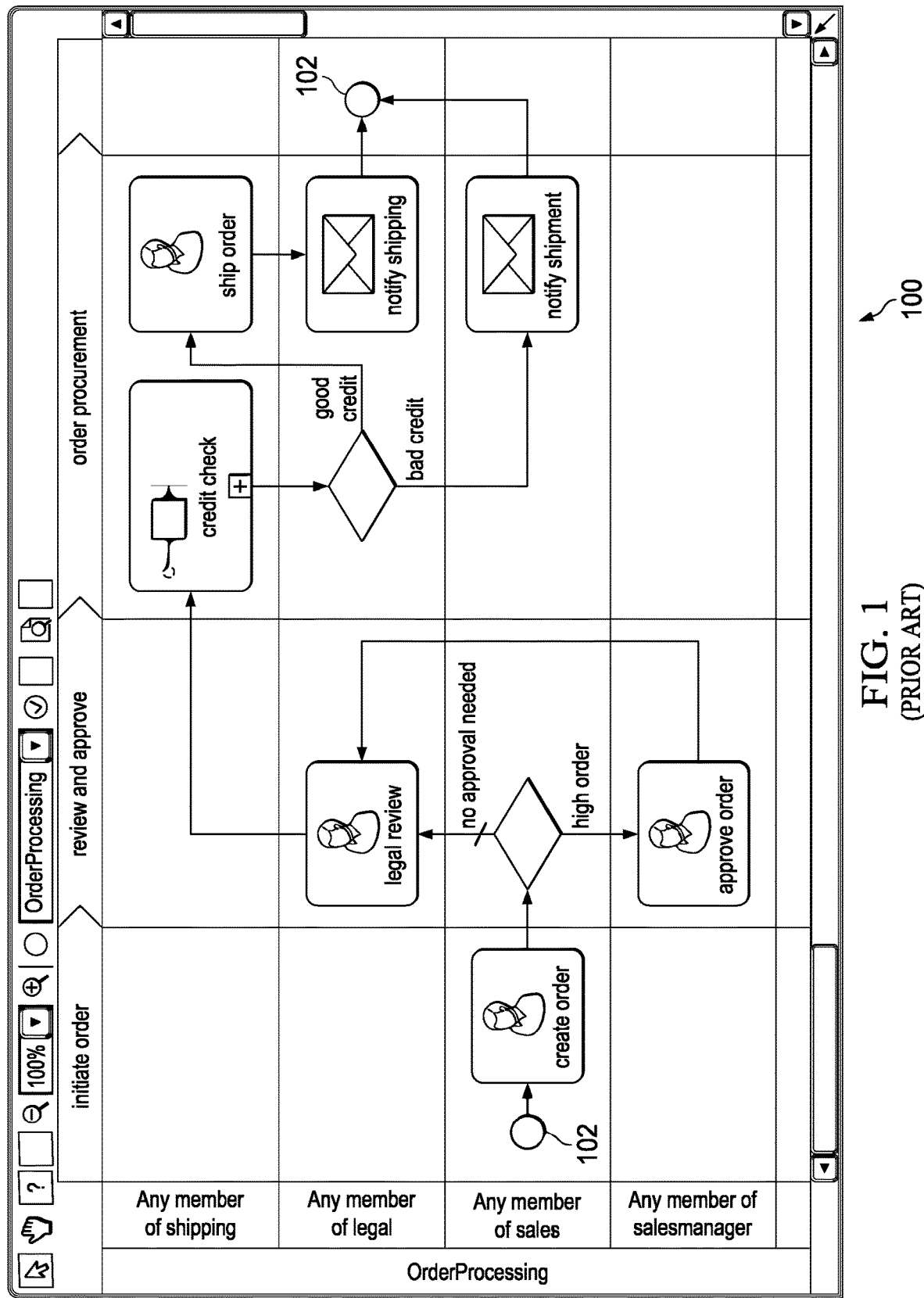
FIG. 1 is a conventional diagram view of a business process which is prior art, and may additionally be used in some embodiments of business process software according to the present invention.
Figure 2:
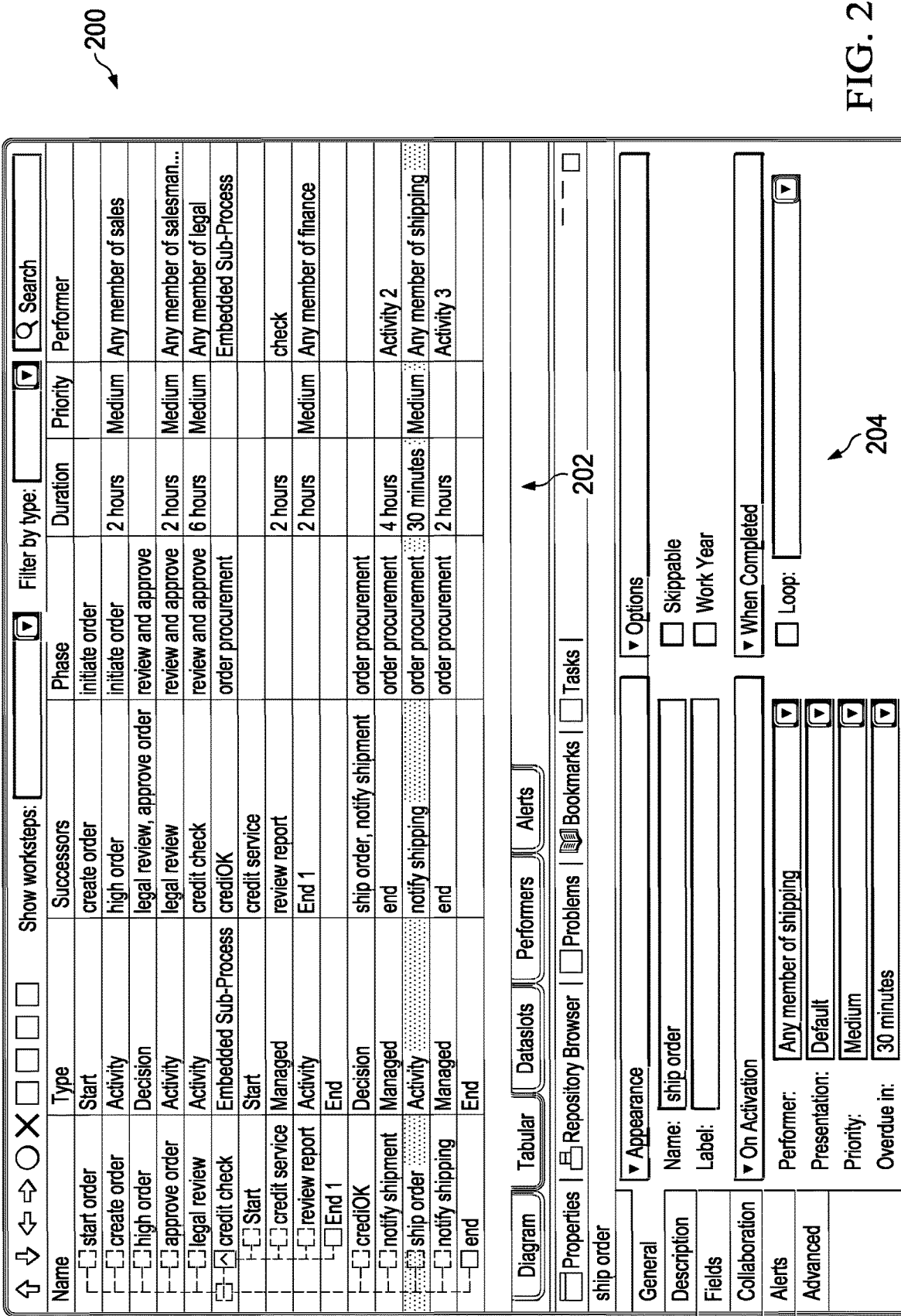
FIG. 2 is a tabular view of a business process which is used in at least some embodiments of the present invention.

FIG. 2 is screenshot 200 from an exemplary IDE (in this example Savvion BPM Studio developed by Savvion Inc.—the words/phrases "Savvion" and/or "Savvion BPM Studio" may be subject to commonlaw and/or registration-based trademark protection in various jurisdictions throughout the world), corresponding to the diagram view 100 discussed above in connection with FIG. 1. Screenshot 200 provides, in tabular form, additional details of each of the process steps constituting the business process. Although the tabular view of the business process is not a primary focus of the present invention, it is noted that both diagram views and tabular views can be useful taken in conjunction with the angular views which are a primary focus of the present invention. As shown in FIG. 2, the process steps can be reviewed in the tabular display portion 202 of screenshot 200, and can be edited in the editing portion 204 of screenshot 200.

Figure 3:
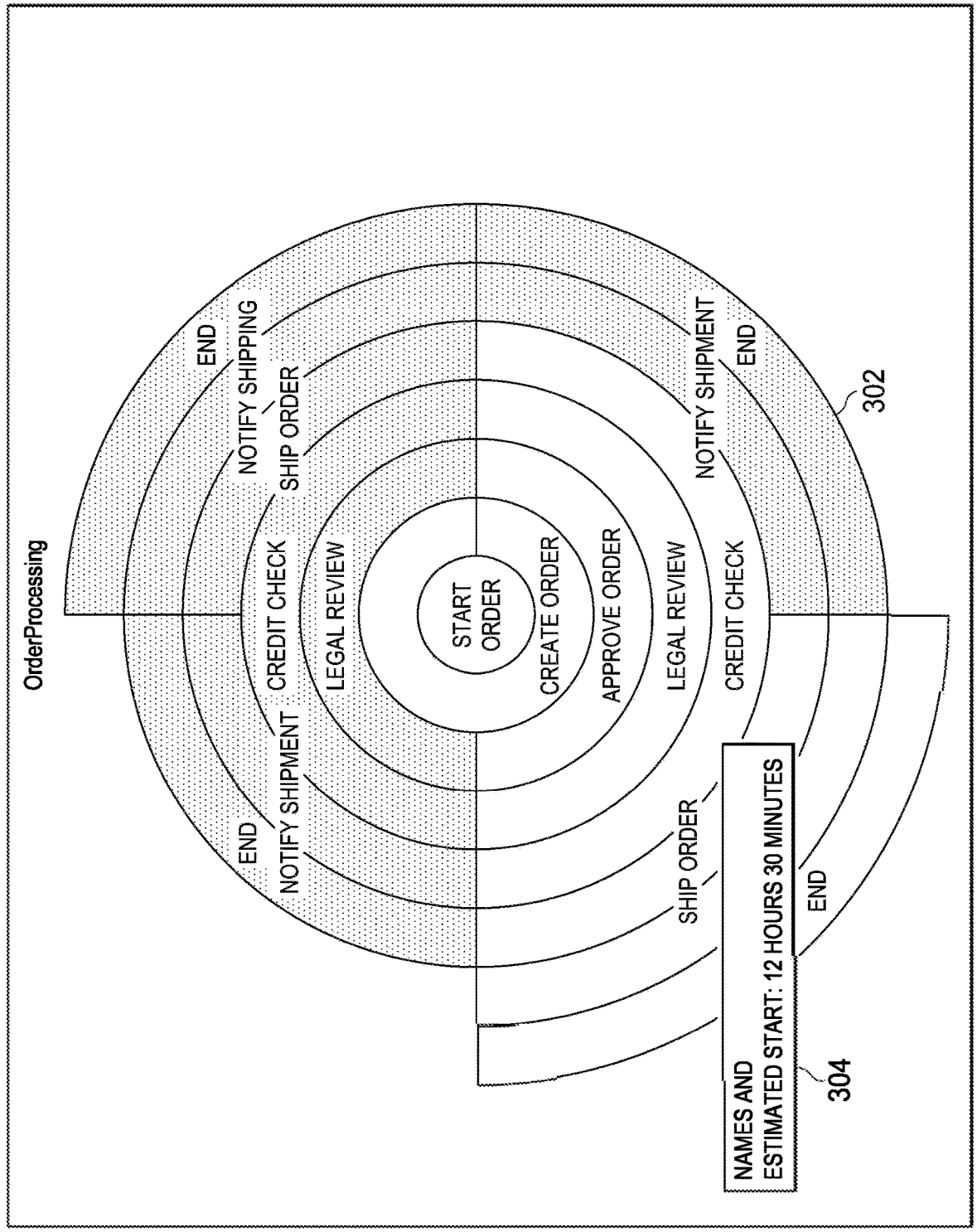
FIG. 3 is a first embodiment of an angular view of a business process according to the present invention.

FIG. 3 shows screenshot 300 which includes an angular view 302 of a business process called "OrderProcessing." As shown in FIG. 3, view 360 extends about an origin at its center about a 360 degree angular sweep to form a circular shape. As illustrated, the view, while abstract, provides important insight into flow and time complexity of the process. The view reveals: (i) that there are 4 paths through the process; (ii) the heatmap of worksteps based on execution duration; and (iii) the estimated completion time of each path through the flow. As the user moves the mouse, starting from the start (the bulls eye), outward, the estimated start time and the workstep name show up as a tooltip. In the diagram, popup window 304 shows that the selected path can be expected to complete about 12 hours and 30 minutes after the initiation of the process.

Figure 4:
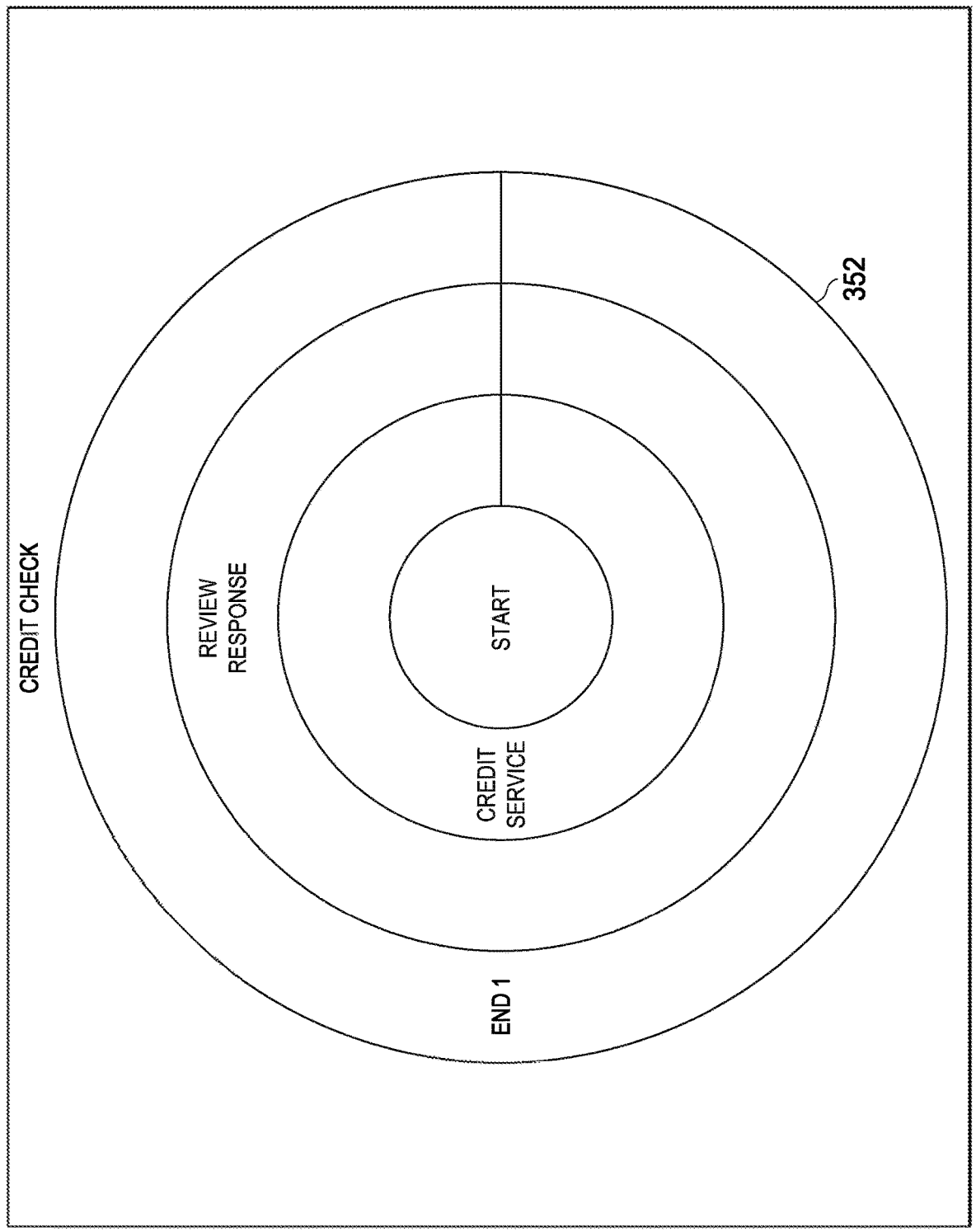
FIG. 4 is an angular view of a portion of a larger business process (also called a sub-process or sub-process drill down) according to the first embodiment of the present invention.

FIG. 4 shows screenshot 350 which includes an angular view 352 of a business process (see DEFINITIONS section) called "CreditCheck." View 352 shows the drill down from the main process's credit check process step. View 352 is a sub-process of the larger process shown in FIGS. 1, 2 and 3. FIG. 4 demonstrates how a single angular block in a higher level view may be used to represent a sub-process having one or more business process step chain(s) of its own. In fact, the angular process step blocks of view 352 may represent sub-sub-process. Moving hierarchically in the other direction, angular view 302 may represent a sub-process of an even larger process (not shown). In this way, it can be seen the angular views of the present invention may helpfully represent a business process at its highest defined level, and also sub-processes, sub-sub-processes and so on.

For a given angular view of a given sub-process, the user may also be allowed to eliminate some of the process step chains of the sub-process. This feature may be helpful when the angular view becomes cluttered in the angular direction.

As described in the claims below, a heatmap may be color coded to show the completions time (expected, projected and/or actual) of the worksteps (or tasks) represented by angular blocks in the angular business process view, with different colors being assigned to steps that fall within various completion time ranges. In addition to color, the width of each segment in the 360 degree view may be used to convey additional visual clues as to frequency of execution of one path versus another. For example, the 'approve order' and 'legal review' activities, of view 302, are assumed to occur with equal probability, each occupying half of allotted space. However, if the data reflects a non symmetrical distribution, the generated 360 degree view can allocate a larger segment of the pie to the activity that occurs more frequently. The wider the section, the more the instances that follow through that section of the execution path, and there is also more angular sweep space to represent concurrent business process step chain(s) (whether they are alternative or parallel, see DEFINITIONS section) following from the relatively wider section.

A tooltip may be defined for each of the activities in the 360 degree view to reflect statistics relevant for the activity. For example, for cost analysis, activity tooltip may include resource cost for completing the activity.

A more compact print-out of the process diagram is an advantage and feature of at least some embodiments of the present invention. Information about a process that may span multiple pages, if printed as diagram, may easily fit in fewer page using an angular business process view.

Interactive reports may contain multiple angular views of a single, complex process. Each report may depict a different aspect of the business process. The exemplary IDE, BPM Studio, with 360 degree view enhancements enables users to publish the process reports (with either estimated, simulated or real data collected from BPMS system) as interactive web pages. The reports may be published to a server for access by a wide audience, or emailed as attachment for local analysis by the email recipient.

The angular business process view of the present invention facilitates managing process complexity through reducing relevant activities into sub-processes. The exemplary IDE, BPM Studio, with 360 degree view enhancement enables automatic detection of sections in the process that may be reduced to a sub-process. The 360 degree view will automatically create a single, drillable activity. Clicking on the activity, from the parent view, opens the 360 degree view of the sub-process. In the example of FIG. 3, the 'check credit' is a drillable activity/sub-process. Clicking on the 'check credit' activity opens the 360 degree view of FIG. 4.

Figure 5:
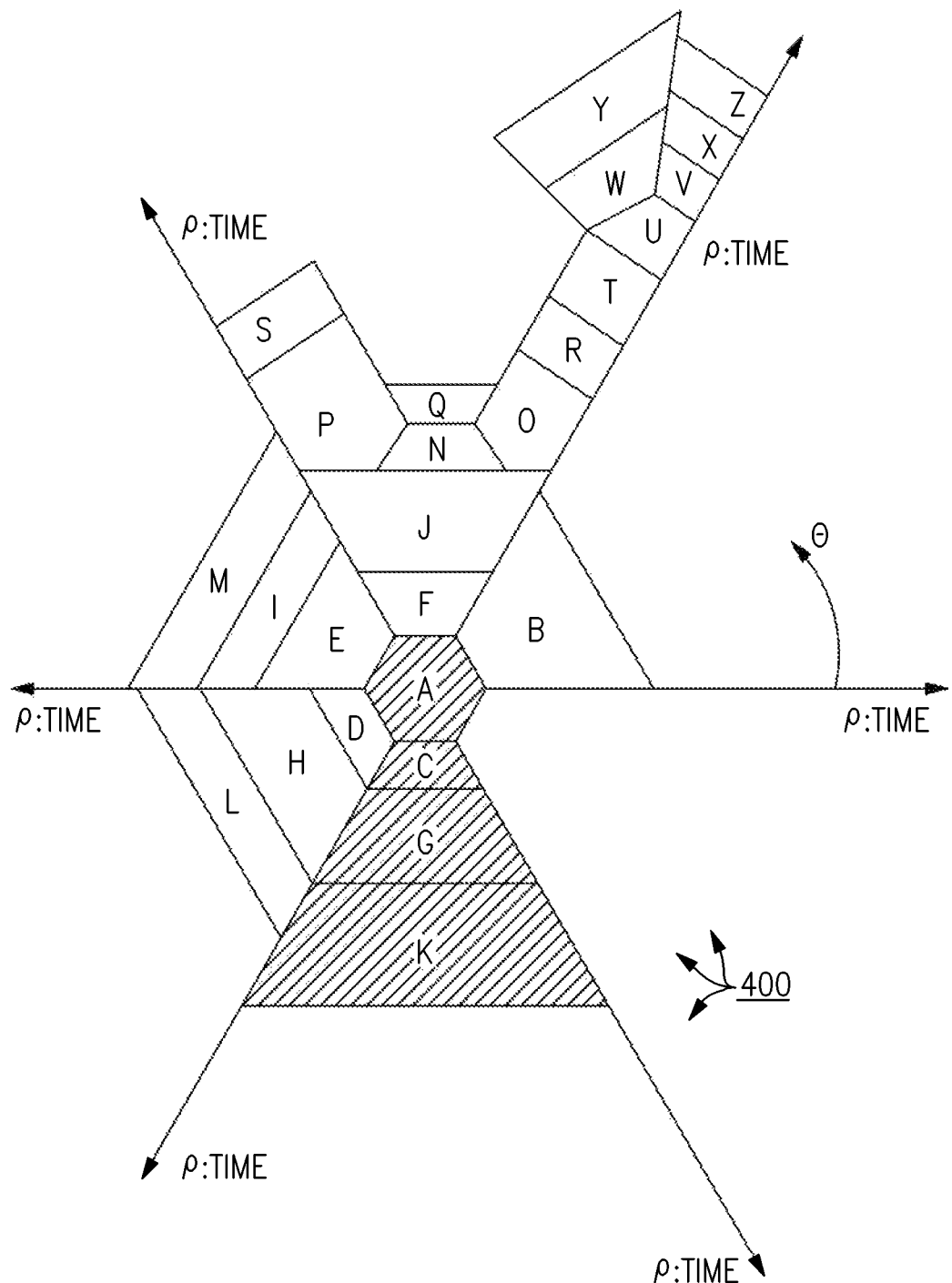
FIG. 5 is a second embodiment of an angular view of a business process according to the present invention.

FIG. 5 shows angular business process view 400 including angular blocks for process steps A to Z. View 400 is not necessarily a preferred embodiment, but is included to help demonstrate the scope of the present invention. The main origin for view 400 is at the center of the process view. Arrow θ represents the angular direction. Six arrows labeled ρ represent the radial direction. In view 400, the circumferential sides of the angular blocks are straight lines, rather than circle segment arc shaped, to define a generally hexagonal scheme. Other general layouts could be used for the angular business process views, including, but not limited to, ellipses or other n-gons. In view 400, the radial lengths of the angular blocks are scaled to represent time (projected and/or actual). Note that in previous views 302 and 352, the radial dimension represented time in the sense that earlier process steps were shown to be radially inward of later-occurring process steps, the radial dimensions in views 302 and 352 were not necessarily scaled so that there is a fixed correspondence between radial length and time units elapsed during a target or actual business process.

While it is not necessary for the radial dimension to represent time, as it does in view 400, this can be helpful because: (i) it provides an intuitive visual representation of process step time for the user; and (ii) it helps to show what process steps are run, or targeted to run, concurrently (in whole or in part), which gives users a good intuitive feel for what the concurrent business process step chains are for a process involving multiple concurrent business process step chains. While the radial dimension may be used to represent time, it is not necessary that the scale of the dimension be linearly correlated with time. Also, the radial dimension may represent the inverse of time in the sense that the earlier times may be radially outward relative to later times, with the latest time being converged to at the origin of the angular view. Because the radial dimension is scaled according to time units, view 400 can give the user an even more accurate idea of concurrency of concurrent business process step chains, which is to say what business process step chains are running (or targeted to run) simultaneously, or at overlapping times.

It also noted that the lower, right-hand segment of process view 400 is unpopulated by any angular blocks. In this sense, view 400 is not a 360 degree view, but it is still an angular business process view. The angular block for task J defines a secondary origin, with multiple series of blocks emerging from this secondary origin. The angular block for task U defines a tertiary origin, with multiple series of blocks emerging from this tertiary origin.

Figure 6:
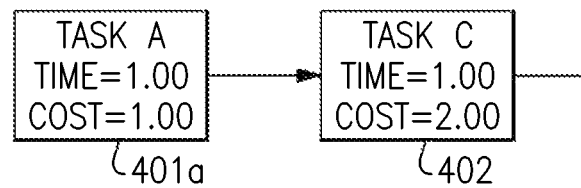
FIG. 6 is a diagram view of a sub-process (or process step chain) of the business process shown in FIG. 5.
Figure 7:
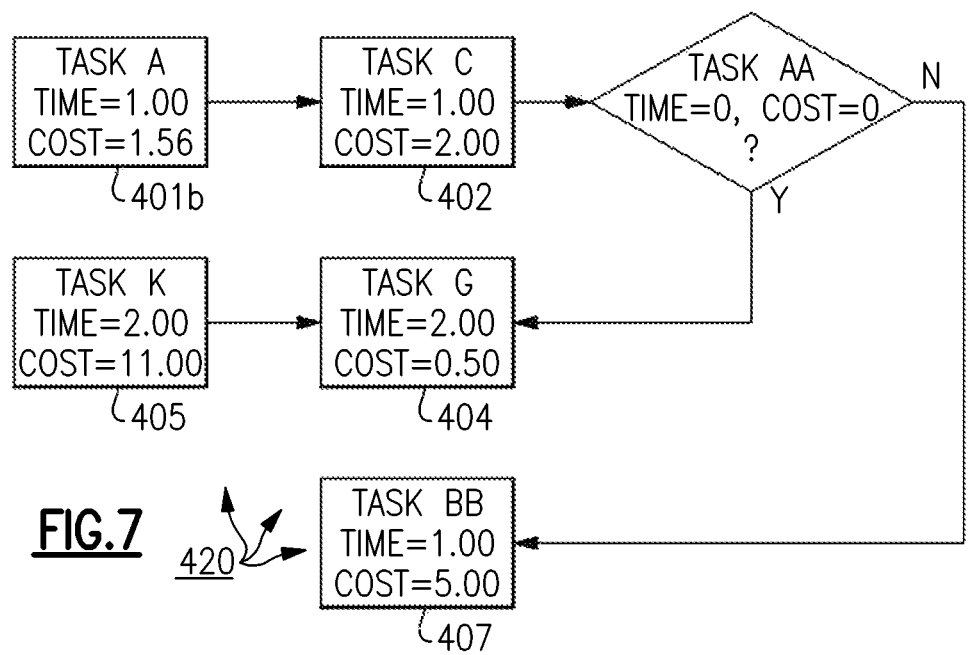
FIG. 7 is a diagram view of a sub-process (or process step chain) of the business process shown in FIG. 9.

As shown by cross-hatching in FIG. 5, a user has selected a single process step chain, including, in order, process steps A, C, G and K. For example, the software may allow a user to select a process step chain in the angular view of the present invention, by indicating a process step with a mouse-driven cursor and then selecting (that is, highlighting) one or more of the process step chains of which the indicated process step is a constituent step. Alternatively, a user may be allowed to highlight multiple process steps, for example, by holding down a control-key continuously while mouse-clicking various process step blocks in the angular view. By selecting a given process step chain, the user may be given the option to show that particular sub-process in the diagram view. For example, FIG. 6 shows how the sub-process selected in FIG. 5 appears in its corresponding diagram view, including process step (or task) A 401a; task C 402; task G 404; and task K. While the angular view is helpful for understanding certain aspects of the process, the diagram view may be helpful for understanding other aspects and/or for editing purposes. As shown in FIG. 7, a user has indeed edited the diagram view of FIG. 6 to insert two process steps: task AA 406; and task BB 407. Because task AA is a decision block type process step, that means that there are two alternative concurrent business process step chains subsequent to task AA, one being constituted by task BB, and the other being constituted by task G and task K.

FIG. 7 also shows that the users has made a modification to task A 401a to convert it to the new version of task A 401b. More specifically, the user has decided to change the targeted cost associated with performing business process step A from 1.00 money unites to 1.56 money units, in response to some revised costing information that has been obtained by the user.

Figure 8:
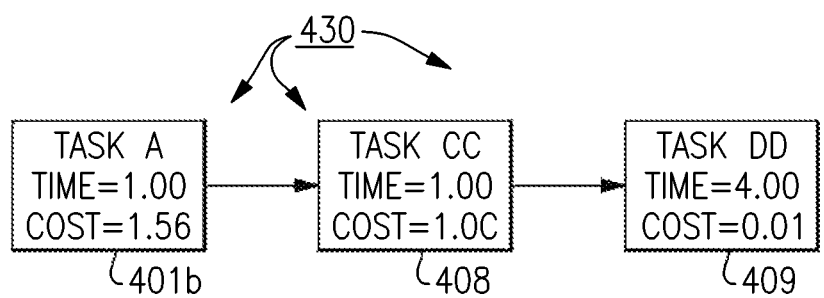
FIG. 8 is a diagram view of a sub-process (or process step chain) of the business process shown in FIG. 9.

As shown in FIG. 8, in additions to the sub-process changes made at FIG. 7, the user is also using the diagram view to add a new sub-process to the larger process of view 400. More particularly, the sub-process being added at FIG. 8 includes task A 401b, task CC 408 and task DD 409.

Figure 9:
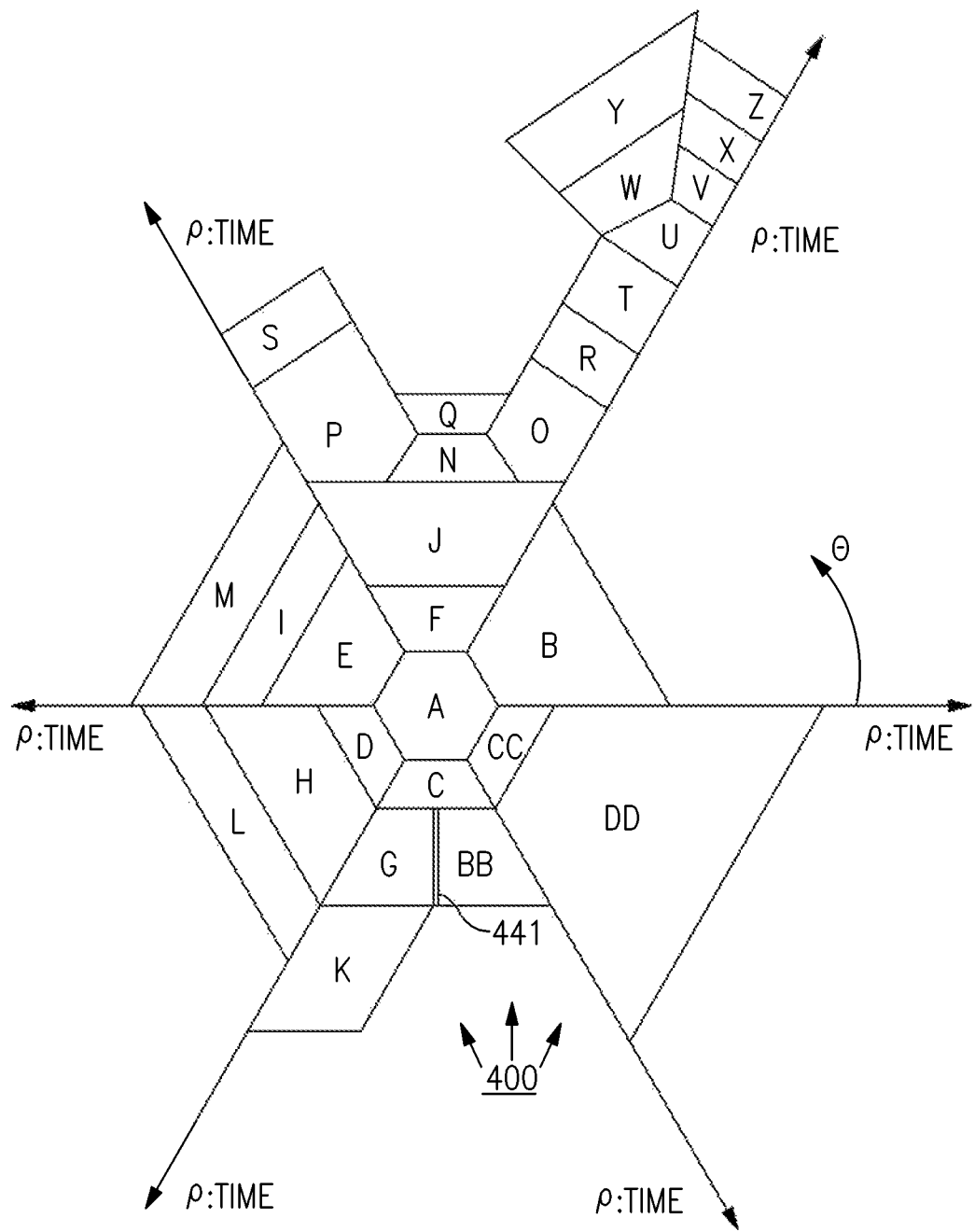
FIG. 9 is a later (post-editing) angular view of the business process of FIG. 5.

As shown in FIG. 9, the user has decided to switch back to the angular view, which now reflects the changes made at FIGS. 7 and 8 and is therefore denominated as revised angular view 440. View 440 includes the sub-process revisions made at FIG. 7, although task AA is not shown because the duration of this process is 0.00 time units, so it has no radial length. The fact that task BB, on one hand, and tasks G,K, on the other hand, now represent alternative concurrent business step chains (as opposed to parallel concurrent business process step chains) in view 440 is the reason that these two concurrent step chains are separated by double line 441, instead of a single line. This is not the only way, or even necessarily the preferred way, to represent the difference between alternative and parallel concurrent business process step chains in an angular view. For example, alternative concurrent step chains could be represented by semi-transparent graphical layers, or as a three dimensional stack extending into the plane of the two dimensional display. As a further example, color coding could be used to distinguish parallel and alternative concurrent step chains. As still a further example, no distinction may be made to distinguish parallel from alternative step chains.

As further shown in view 440, the new sub-process of FIG. 8, including tasks CC and DD, has been added in a previously-vacant angular sweep.

Figure 10:
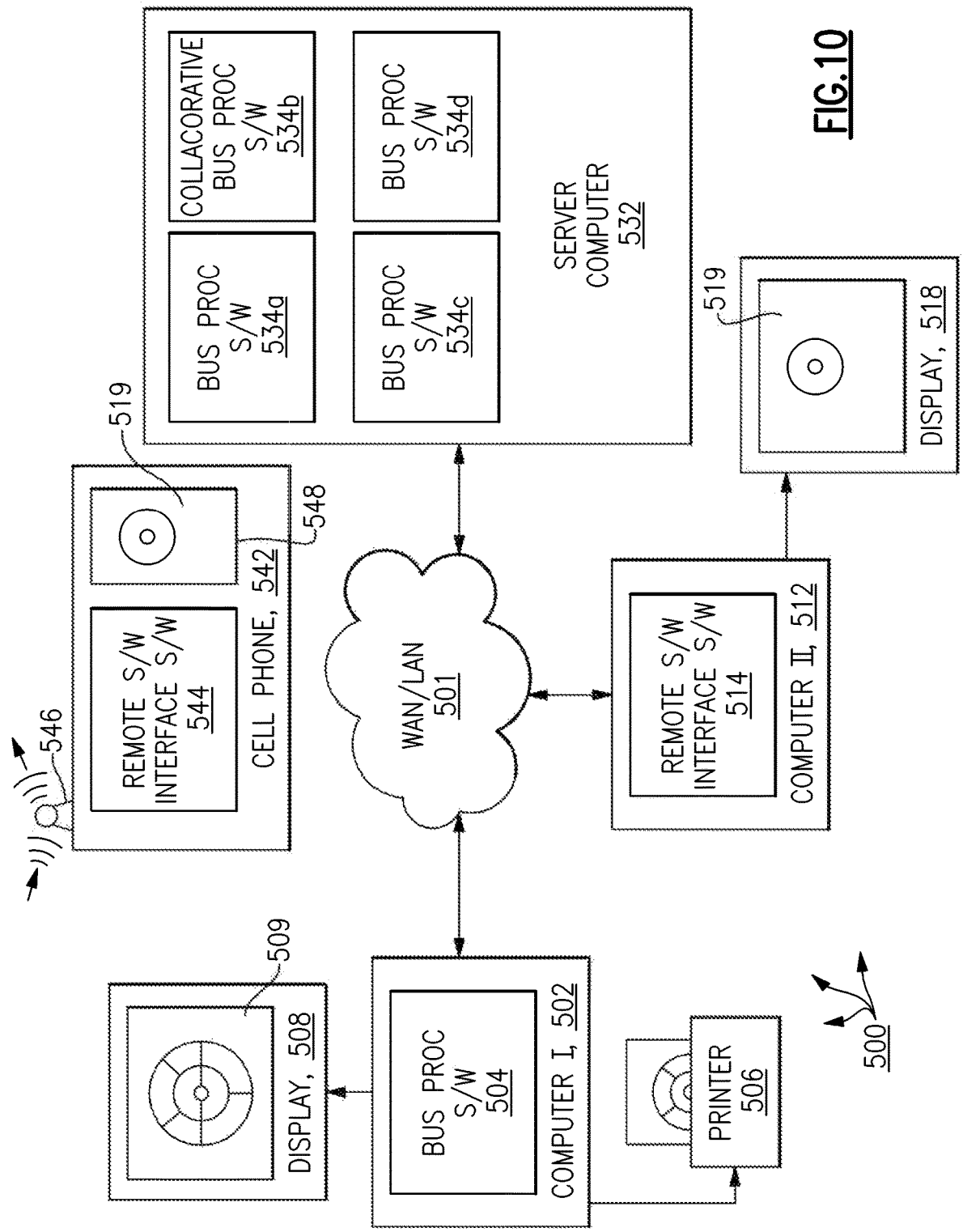
FIG. 10 is a schematic view of a first embodiment of a computer system for running and using business process related software according to the present invention.

FIG. 10 shows computer system 500 for running business process related software according to the present invention. System 500 includes wide area network (WAN)/local area network (LAN) 501; computer I 502; business process related software 504, 534a, 534c, 534d; display devices 508, 519; displays 519; computer II 512; remote software interface software 514, 544; server computer 532; cell phone 542; wireless transceiver 546 and display panel 548. As shown in FIG. 10, a "standalone" version of business process related software is running on a user personal computer in the form of computer I. Computer I outputs the angular view(s) according to the present invention to display 509 of display device 508 and also to printer 506 (in hard copy form).

The business process related software according to the present invention may also be used in a distributed manner over multiple, remote devices connected by a communication network. For example, as shown in FIG. 10, the server computer is ready to server the business process related software in either "standalone" form 534a, 534c, 534d, or in its collaborative, multiple simultaneous user form 534b. As a matter of fact, both the cell phone 542 user and the computer II 512 user are shown as collaborating by using collaborative business process software 534b over the network, which is why their respective displays both show display 519. In order for the cell phone and computer II to use the remote business process related software on the server computer, they are respectively shown to be loaded with remote software interface software 514. However, in some system embodiments of the present invention, no specialized software may be required on the guest machine. In fact, the guest machine might even be a thin client or dumb terminal in some system embodiments of the present invention.

Figure 11:
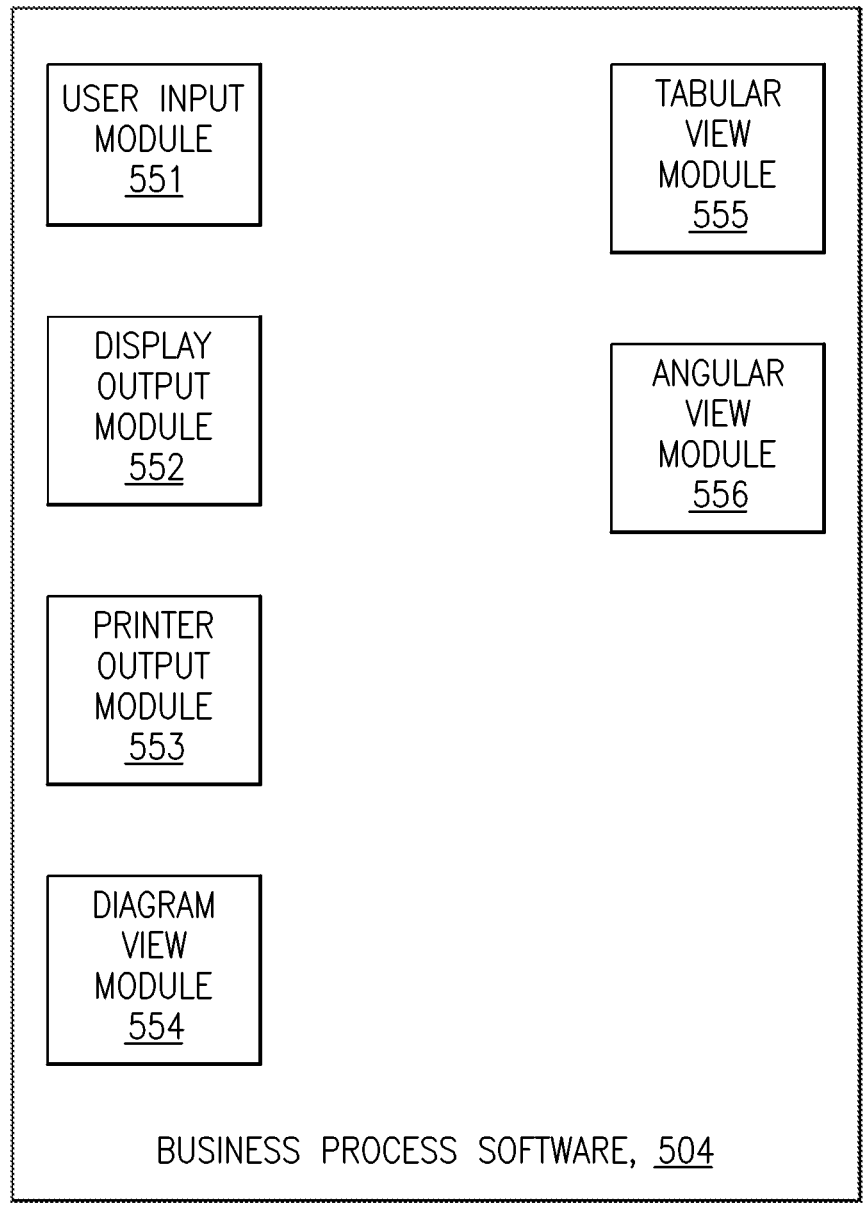
FIG. 11 is a schematic view of a first embodiment of business process related software according to the present invention.

FIG. 11 shows a more detailed schematic view of business process software 504, including: user input module 551; display out module 552; printer output module 553; diagram view module 554; tabular view module 555; and angular view module 556. There may be additional modules, as is now conventional or later developed, such as business process file saving module, business process template database, and so on. The user input module takes in user input for the purposes of viewing, printing and/or editing the business process. The display output module takes a display of the generated business process view, generated by module (s) 554, 555 and/or 556, as outputs it in an appropriate form to be displayed on a display device, such as display device 508. The printer output module takes a display of the generated business process view, generated by module(s) 554, 555 and/or 556, as outputs it in an appropriate form to be printed on a printer, such as printer 506. The diagram view module generates the diagram view of the business process, as shown in FIG. 1. The tabular view module generates the tabular view of the business process, as shown in FIG. 2. The angular view module generates the angular view of the business process, as shown in FIG. 3.

Figure 12:
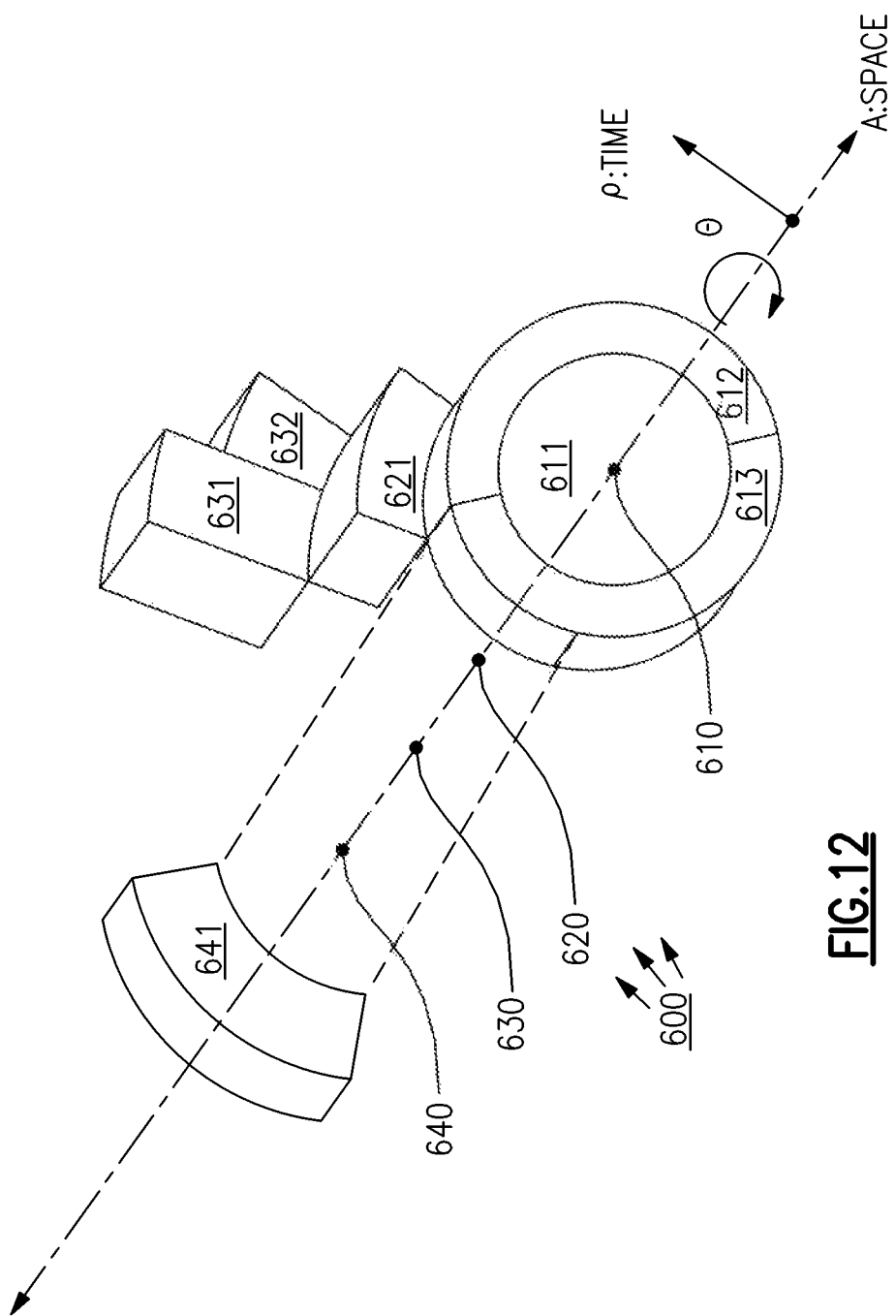
FIG. 12 is a second embodiment of an angular view of a business process according to the present invention.

FIG. 12 shows three dimensional angular process view 600 including: axial dimension A; radial dimension ρ; angular dimension θ; physical space location origins 610, 620, 630, 640; and three dimensional process step blocks 611, 621, 613, 621, 631, 632, 641. In this three dimensional process view, different points (or origins) along the axial direction represent different places that different process steps are performed (for example, at the bank, at the attorney's office, at the accountants office, at the manufacturing facility). Each origin is a center for the three dimensional process blocks representing steps performed at the location of the origin. For example, task 621 is at a different axial location than tasks 611, 612 and 613, and centered about a different origin (620 instead of 610) because this task is performed at a different place than the others. Alternatively, the axial dimension could be used to represent other variables, such as the entity or person responsible for performing the task. In three dimensional angular views of the present invention (which are not necessarily preferred), the user is preferably allowed to adjust the perspective viewing vector and/or to take orthogonal cross-sectional slices (perpendicular to the axial direction A).

Definitions

The following definitions are provided to facilitate claim interpretation and the lexicography set forth in this section shall be considered as controlling over any lexicographic inferences that might otherwise be attempted to be drawn based on other sections of this document:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

Business process related computer software: any software used to view and/or edit any visual representation of any business process.

Process steps: any step regardless of whether it is purely decisional, involves tangible subject matter; or involves concrete action.

Business process: includes, but is not limited to processes, sub-processes, sub-sub-processes and so on.

Sub-process: any subset of one or more process steps of a larger (or co-extensive) process, regardless of whether all the process steps are joined in any sort of chain relationship (although sub-processes generally will be in the form of one or more business process step chains that share one or more common process steps).

Concurrent business process step chain(s): any sub-sets of business process steps of a larger business process that would, or are targeted to, at least partially overlap in time if all of the business process steps of the sub-set of business process steps were performed; one type of concurrent business process step chain is the alternative concurrent business process step chain(s), where the temporally overlapping steps of two chains are be performed in the alternative, where only one chain or the other is performed during any iteration of the process (or recurring sub-process); another type of concurrent business process step chain is the parallel concurrent business process step chain(s), where the temporally overlapping steps of two chains are to both be actually performed (in an at least partially simultaneous manner), during any iteration of the process (or recurring sub-process).

Transforming matter: transforming matter in any way that qualifies as patent-eligible subject matter under applicable patent law.

Machine: any machine with sufficient computational power, sufficient functional specificity and otherwise sufficient to confer patent eligible subject matter status under applicable patent law.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A system comprising:
a processor; and
a memory storing code, wherein when executed by the processor, the code causes the processor to perform operations comprising:
display a multi-step process as at least a visual representation of an angular process view, wherein:
the angular process view defines at least an angular direction and a radial direction, with a plurality of the process steps being represented as a corresponding angular block in the angular process view;
each angular block includes an angular segment as a function of at least one of (i) a number of parallel concurrent process steps and (ii) a number of alternative concurrent process steps,
an ordering of the angular blocks in the radial direction represents at least a temporal order of the plurality of process steps;
a radial length of each angular block comprises a function of an amount of time that the corresponding process step takes to complete; and
when the process steps are radially aligned, but angularly offset, the process steps represent parallel concurrent or alternatively concurrent process steps.

2. The system of claim 1 wherein the code further causes the processor to perform operations comprising:
transform matter based, at least in part, on a user's review and understanding of the visual representation of the angular process view.

3. The system of claim 1 wherein the code further causes the processor to perform operations comprising:
receive user input through a user interface that includes the visual representation of the angular process view; and
edit the angular process view based on the user input.

4. The system of claim 1 wherein the code further causes the processor to perform operations comprising:
display an annotation on the angular business view.

5. The system of claim 4 wherein the annotation includes information to facilitate online, targeted analysis.

6. The system of claim 1 wherein the code further causes the processor to perform operations comprising:
generate an angular process heat-map for the process.

7. The system of claim 6 wherein the heat map is color coded.

8. The system of claim 7 wherein:
the process comprises a plurality of worksteps;
each workstep has a respective completion time;
worksteps whose respective completion times are within a first predetermined time range are represented in a first color in the heatmap;
worksteps whose respective completion times are within a second predetermined time range are represented in a second color in the heatmap;
the first predetermined time range does not overlap with the second predetermined time range; and
the first color is different than the second color.

9. A system comprising:
a processor; and
a memory storing code, wherein when executed by the processor, the code causes the processor to perform operations comprising:
receive information from a machine, wherein the information represents a multi-step process as at least a visual representation of an angular process view; and display the visual representation of an angular process view, wherein the visual representation information is generated by a machine, wherein:
the angular process view defines at least an angular direction and a radial direction, with plurality of the process steps being represented as a corresponding angular block in the angular process view;
each angular block includes an angular segment as a function of at least one of (i) a number of parallel concurrent process steps and (ii) a number of alternative concurrent process steps,
an ordering of the angular blocks in the radial direction represents at least a temporal order of the plurality of process steps;
a radial length of each angular block comprises a function of an amount of time that the corresponding process step takes to complete; and
when the process steps are radially aligned, but angularly offset, the process steps represent parallel concurrent or alternatively concurrent process steps.

10. The system of claim 9 wherein when executed by the processor, the code causes the processor to further perform operations comprising:
transforming matter based, at least in part, on a user's review and understanding of the visual representation of the angular process view.

11. The system of claim 9 wherein when executed by the processor, the code causes the processor to further perform operations comprising:
receiving user input through a user interface that includes the visual representation of the angular process view; and
editing the angular process view based on the user input.

12. The system of claim 9 wherein when executed by the processor, the code causes the processor to further perform operations comprising:
displaying an annotation on the angular business view.

13. The system of claim 12 wherein the annotation includes information to facilitate online, targeted analysis.

14. The system of claim 9 wherein when executed by the processor, the code causes the processor to further perform operations comprising:
generating an angular process heat-map for the process.

15. The system of claim 14 wherein the heat-map is color coded.

16. The system of claim 15 wherein:
the process comprises a plurality of worksteps;
each workstep has a respective completion time;
worksteps whose respective completion times are within a first predetermined time range are represented in a first color in the heatmap;
worksteps whose respective completion times are within a second predetermined time range are represented in a second color in the heatmap;
the first predetermined time range does not overlap with the second predetermined time range; and
the first color is different than the second color.

\* \* \* \* \*